(12) United States Patent
Butler et al.

(10) Patent No.: US 11,776,418 B2
(45) Date of Patent: *Oct. 3, 2023

(54) INTERACTIVE PHONICS GAME SYSTEM AND METHOD

(71) Applicant: Learning Squared, Inc., Sunnyvale, CA (US)

(72) Inventors: Andrew Butler, Sunnyvale, CA (US); F Brian Iannce, San Jose, CA (US); Carey Lee, Redwood City, CA (US); Hector Javier Farias, Castro Valley, CA (US)

(73) Assignee: Learning Squared, Inc., Sunnyvale, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/152,032

(22) Filed: Jan. 19, 2021

(65) Prior Publication Data

US 2021/0248919 A1 Aug. 12, 2021

Related U.S. Application Data

(63) Continuation of application No. 16/794,591, filed on Feb. 19, 2020, now Pat. No. 10,922,994, which is a
(Continued)

(51) Int. Cl.
*G09B 17/00* (2006.01)
*G09B 5/06* (2006.01)
(Continued)

(52) U.S. Cl.
CPC ............. *G09B 17/003* (2013.01); *A63H 3/36* (2013.01); *A63H 17/26* (2013.01); *G06F 3/0346* (2013.01); *G09B 5/065* (2013.01); *A63H 2200/00* (2013.01)

(58) Field of Classification Search
CPC . G09B 17/00; G09B 5/06; A63H 3/36; A63H 17/26; G06F 3/0346
See application file for complete search history.

(56) References Cited

U.S. PATENT DOCUMENTS 5,596,698 A * 1/1997 Morgan ................... G09B 5/14
434/308
5,823,782 A  10/1998 Marcus et al.
(Continued)

OTHER PUBLICATIONS

"U.S. Appl. No. 14/838,307, Non Final Office Action dated Aug. 9, 2016", 13 pgs.
(Continued)

*Primary Examiner* — Eddy Saint-Vil
(74) *Attorney, Agent, or Firm* — Schwegman Lundberg & Woessner, P.A.

(57) ABSTRACT

A system for encouraging a child to learn to read, comprising a computing device and at least one physical manipulative, wherein the computing device can identify the physical manipulative and display at least one word relating to the physical manipulative. In an embodiment, a letter identification board with letter manipulatives is included, wherein a child can spell out a word on the letter identification board and the computing device shows an animation of the physical manipulative performing the action indicated by the word.

20 Claims, 4 Drawing Sheets

Figure 1:
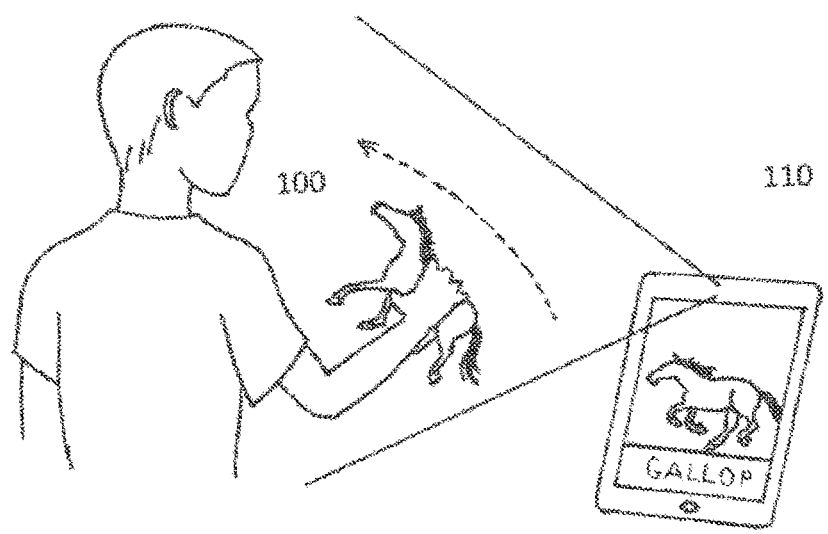

Related U.S. Application Data continuation of application No. 16/451,756, filed on Jun. 25, 2019, now Pat. No. 10,607,501, which is a continuation of application No. 15/428,154, filed on Feb. 9, 2017, now Pat. No. 10,380,909, which is a continuation of application No. 14/838,307, filed on Aug. 27, 2015, now abandoned.

(60) Provisional application No. 62/044,310, filed on Aug. 31, 2014.

(51) Int. Cl.
*A63H 3/36* (2006.01)
*A63H 17/26* (2006.01)
*G06F 3/0346* (2013.01)

(56) References Cited

U.S. PATENT DOCUMENTS

| | | | |
|---|---|---|---|
| 5,853,327 | A | 12/1998 | Gilboa |
| 6,290,565 | B1 | 9/2001 | Galyean, III et al. |
| 6,394,872 | B1 | 5/2002 | Watanabe et al. |
| 7,050,754 | B1 | 5/2006 | Marcus et al. |
| 8,057,233 | B2 | 11/2011 | Owen |
| 8,287,372 | B2 | 10/2012 | Hong et al. |
| 8,495,133 | B2 | 7/2013 | Hoo |
| 8,926,395 | B2 | 1/2015 | Zheng |
| 9,259,651 | B1* | 2/2016 | Yano ................ A63F 13/50 |
| 10,380,909 | B2 | 8/2019 | Butler et al. |
| 10,607,501 | B2 | 3/2020 | Butler et al. |
| 10,922,994 | B2 | 2/2021 | Butler et al. |
| 2002/0149583 | A1* | 10/2002 | Segawa ............ G06F 3/04815 |
| | | | 345/420 |
| 2002/0160340 | A1 | 10/2002 | Marcus et al. |
| 2003/0148249 | A1 | 8/2003 | Marcus et al. |
| 2006/0215476 | A1 | 9/2006 | Owen |
| 2009/0137185 | A1 | 5/2009 | Zheng |
| 2009/0286210 | A1* | 11/2009 | Spreen ................ G09B 21/009 |
| | | | 434/308 |
| 2011/0016173 | A1 | 1/2011 | Hoo |
| 2012/0258436 | A1* | 10/2012 | Lee .................... G09B 19/003 |
| | | | 434/362 |
| 2012/0295704 | A1 | 11/2012 | Reiche et al. |
| 2013/0165223 | A1 | 6/2013 | Leyland et al. |
| 2013/0275313 | A1* | 10/2013 | Vahid ................ G06Q 10/20 |
| | | | 705/305 |
| 2013/0288563 | A1* | 10/2013 | Zheng ................ A63H 30/04 |
| | | | 446/268 |
| 2013/0296058 | A1 | 11/2013 | Leyland et al. |
| 2013/0302763 | A1* | 11/2013 | Edwards .............. G09B 5/06 |
| | | | 434/362 |
| 2013/0303047 | A1 | 11/2013 | Albert et al. |
| 2014/0030955 | A1* | 1/2014 | Smetanin .............. A63H 3/36 |
| | | | 446/268 |
| 2014/0121008 | A1* | 5/2014 | Canessa .............. A63F 13/69 |
| | | | 463/29 |
| 2014/0162785 | A1 | 6/2014 | Reiche et al. |
| 2014/0273717 | A1 | 9/2014 | Judkins et al. |
| 2014/0274313 | A1 | 9/2014 | Bala et al. |
| 2014/0364240 | A1 | 12/2014 | Leyland |
| 2015/0042795 | A1* | 2/2015 | Tsuria ..................... A63F 1/00 |
| | | | 348/143 |
| 2015/0065258 | A1 | 3/2015 | Meade |
| 2015/0087427 | A1 | 3/2015 | Wane |
| 2016/0184724 | A1 | 6/2016 | Butler et al. |
| 2017/0213475 | A1 | 7/2017 | Butler et al. |
| 2019/0318647 | A1 | 10/2019 | Butler et al. |
| 2020/0184842 | A1 | 6/2020 | Butler et al. |

OTHER PUBLICATIONS

"U.S. Appl. No. 15/428,154, Non Final Office Action dated Feb. 8, 2018", 21 pgs.

"U.S. Appl. No. 15/428,154, Response filed Aug. 5, 2018 to Non Final Office Action dated Feb. 8, 2018", 26 pgs.

"U.S. Appl. No. 15/428,154, Final Office Action dated Dec. 5, 2018", 11 pgs.

"U.S. Appl. No. 15/428,154, Response filed Mar. 5, 2019 to Final Office Action dated Dec. 5, 2018", 12 pgs.

"U.S. Appl. No. 15/428,154, Notice of Allowance dated Apr. 3, 2019", 7 pgs.

"U.S. Appl. No. 15/428,154, Corrected Notice of Allowability dated May 13, 2019", 2 pgs.

"U.S. Appl. No. 16/451,756, Preliminary Amendment filed Jul. 25, 2019", 3 pgs.

"U.S. Appl. No. 16/451,756, Non Final Office Action dated Aug. 5, 2019", 18 pgs.

"U.S. Appl. No. 16/451,756, Examiner Interview Summary dated Oct. 9, 2019", 3 pgs.

"U.S. Appl. No. 16/451,756, Response filed Oct. 24, 2019 to Non-Final Office Action dated Aug. 5, 2019", 17 pgs.

"U.S. Appl. No. 16/451,756, Notice of Allowance dated Nov. 20, 2019", 7 pgs.

"U.S. Appl. No. 16/794,591, Preliminary Amendment filed Feb. 27, 2020", 3 pgs.

"U.S. Appl. No. 16/794,591, Non Final Office Action dated Jul. 2, 2020", 9 pgs.

"U.S. Appl. No. 16/794,591, Response filed Sep. 21, 2020 to Non Final Office Action dated Jul. 2, 2020", 9 pgs.

"U.S. Appl. No. 16/794,591, Notice of Allowance dated Oct. 15, 2020", 5 pgs.

U.S. Appl. No. 14/838,307, filed Aug. 27, 2015, Dynamic App Programming Environment With Physical Object Interaction.

U.S. Appl. No. 15/428,154, U.S. Pat. No. 10,380,909, filed Feb. 9, 2017, Interactive Phonics Game System and Method.

U.S. Appl. No. 16/451,756, U.S. Pat. No. 10,607,501, filed Jun. 25, 2019, Interactive Phonics Game System and Method.

U.S. Appl. No. 16/794,591, U.S. Pat. No. 10,922,994, filed Feb. 19, 2020, Interactive Phonics Game System and Method.

* cited by examiner

INTERACTIVE PHONICS GAME SYSTEM AND METHOD

CROSS-REFERENCE TO RELATED APPLICATIONS

The present application is a continuation of U.S. application Ser. No. 16/794,591, filed Feb. 19, 2020, which is a continuation of U.S. application Ser. No. 16/451,756, filed Jun. 25, 2019, which is a continuation of U.S. application Ser. No. 15/428,154, filed Feb. 9, 2017, which is a continuation of U.S. application Ser. No. 14/838,307, filed Aug. 27, 2015, which is a continuation in part of U.S. application Ser. No. 14/838,307, filed Aug. 27, 2015, which claims the benefit of priority of U.S. Provisional App. No. 62/044,310, filed Aug. 31, 2014, which are herein incorporated by reference in their entireties.

BACKGROUND

Field of the Invention

The present invention is generally in the area of educational toys for children, and specifically relates to a system and method of teaching phonics involving physical manipulatives as well as software.

Description of Related Art

Children learning to read are often encouraged to use phonics to "sound out" letters in a word. This helps the child understand the sounds made by different letters and thus assimilate the rules of English spelling and pronunciation. Since children are physical learners and respond well to tactile stimulation, many manipulatives exist for the purpose of teaching reading—alphabet blocks, letter-shaped magnets, and other similar things. A child using such toys can learn the shape of the letters by touch as well as by sight and thus learn them better.

Many software games exist for the purpose of teaching children to read, but as mentioned, for optimal learning, it is desirable for such a software game to interact with a system involving physical manipulatives. A need therefore exists for a system that can interact with manipulatives, identify them, and communicate this information to a computing device.

SUMMARY OF THE INVENTION

An object of the present invention is to provide a system for identifying toy manipulatives, communicating the identification information to a computing device, and using it to instruct the child in reading.

Another object of the present invention is to provide an educational toy that combines physical manipulatives with a software game.

The system of the present invention comprises at least one physical manipulative; a computing device comprising a display, a user interface, an identification module for identifying the at least one physical manipulative, and a communication module for communicating with a server; and a server comprising a database wherein the database comprises a listing of physical manipulative and at least one descriptive attribute for each physical manipulative. The computing device is configured to identify the physical manipulative and to display or modify at least one word related to the physical manipulative on the display.

In an embodiment, the system also comprises a set of letter manipulatives, a letter identification board on which the letter manipulatives are placed, an identification module for identifying the letter manipulatives that are placed on the letter identification board. The computing device is further configured to identify any letter manipulatives placed on the letter identification board and identify a word spelled out by the letter manipulatives.

The physical manipulatives can be animal figures, cartoon characters, dolls, action figures, or vehicles.

The descriptive attributes can be personality, habits, sounds, phrases, geographic origin, size, diet, spelling of a name, pronunciation of a name, at least one Internet link. The at least one word may be related to the at least one descriptive attributes.

The identification module may comprise a camera, a NFC module, a QR reader, a bar code reader, a RF receiver, or a sound detection device.

The computing device may also be configured to detect a motion pattern of the physical manipulative and display at least one word related to the motion pattern on the display.

The computing device may also be configured to identify at least one word spelled out by the letter manipulatives. If the at least one word relates to an action, the computing device displays an animation showing the physical manipulative performing the action; if the at least one word relates to an orientation, the computing device displays the physical manipulative in that orientation; if the at least one word relates to a position, the computing device displays the physical manipulative in the position.

The computing device may also be configured to detect the orientation of the physical manipulative and display at least one word relating to the orientation on the display.

The computing device may be a tablet, laptop, smartphone, desktop, or a wearable computing device such as smart glasses.

In an embodiment, there are two physical manipulatives. The computing device is further configured to detect their relative position, the absolute position of each physical manipulative, or the orientation of each physical manipulative, and display at least one word relating to the interaction between the two physical manipulatives.

In an embodiment, there are two physical manipulatives, and the computing device is further configured to identify at least one word spelled out by the letter manipulatives, and if the at least one word relates to the relationship between the two physical manipulative, the computing device displays an animation showing the relationship between the two physical manipulatives.

The method of the present invention comprises detecting the presence of at least one physical manipulative near a computing device, identifying the physical manipulative, and using the computing device to display at least one word relating to the physical manipulative.

In an embodiment, the method of the present invention further comprises detecting the presence of at least one letter manipulative on a letter identification board, identifying each letter manipulative, identifying a word spelled out by the at least one letter manipulative, and if the word relates to an action, using the computing device to display an animation of the physical manipulative performing the action; if the word relates to an orientation, using the computing device to display the physical manipulative in the orientation; and if the word relates to a position, using the computing device to display the physical manipulative in the position.

In an embodiment, the method of the present invention further comprises detecting a motion pattern of the physical manipulative near the computing device and using the computing device to display at least one word relating to the physical manipulative and the motion pattern.

In an embodiment, the method of the present invention further comprises detecting the presence of a second physical manipulative near the computing device, using the computing device to identify any relationship between the physical manipulative and the second physical manipulative, and using the computing device to display at least one word relating to the relationship between the physical manipulative and the second physical manipulative.

In an embodiment, the method of the present invention further comprises detecting the presence of a second physical manipulative near the computing device, detecting the presence of at least one letter manipulative on a letter identification board, identifying each letter manipulative, identifying a word spelled out by the at least one letter manipulative, and if the word relates to a relationship, using the computing device to display the physical manipulative and the second physical manipulative in the relationship.

In an embodiment, the method further comprises identifying at least one descriptive attribute pertaining to the physical manipulative, such as personality, habits, sounds, phrases, geographic origin, size, diet, spelling or pronunciation of a name, or link to the Internet, and displaying at least one word pertaining to the at least one descriptive attribute.

In an embodiment, the at least one physical manipulative is a doll, an animal figure, a cartoon character figure, an action figure, a vehicle.

The step of identifying the at least one physical manipulative may be performed by a QR reader, a bar code reader, a camera, a NFC reader, a RF receiver, or a sound detection device.

LIST OF FIGURES

Figure 2:
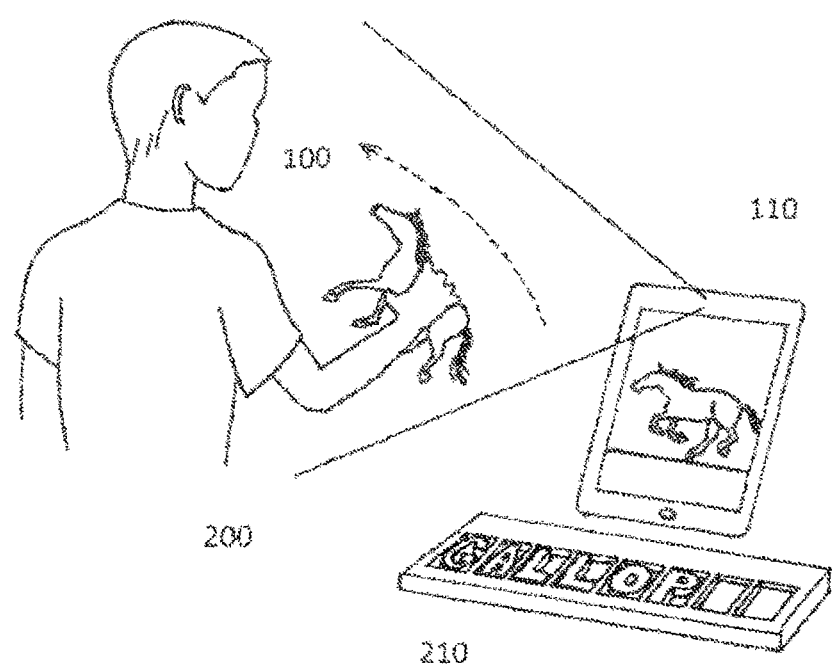
Figure 3:
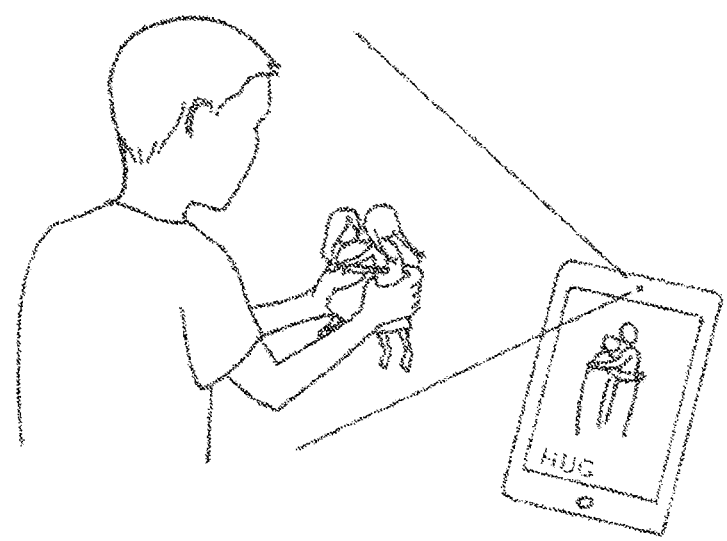
Figure 4:
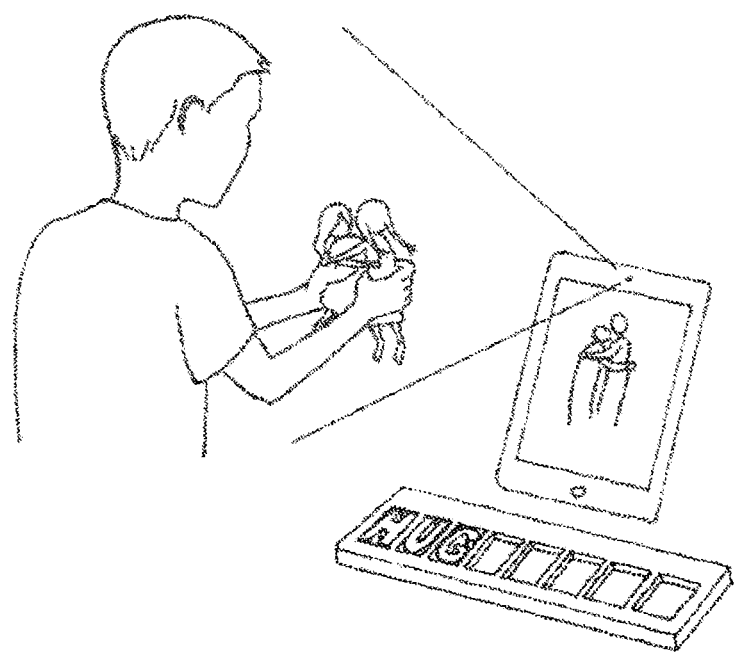

FIG. 1 shows an embodiment of the present invention.
FIG. 2 shows an embodiment of the present invention that also comprises a letter identification board.
FIG. 3 shows an embodiment of the present invention.
FIG. 4 shows an embodiment of the present invention that also comprises a letter identification board.

DETAILED DESCRIPTION

Several embodiments of the present invention are described below. It will be understood that the invention is not limited to these embodiments, but is only limited by the appended claims.

While any computing device may be used to implement the present invention, assuming it has sufficient computing power to identify a physical manipulative and to display animations on the screen, a tablet is used in the preferred embodiment. It will be understood, however, that any laptop, smartphone, desktop computer, or gaming device may also be used to implement the present invention. Wearable computing devices comprising head-mounted displays may also be used. For simplicity, the word "tablet" will be used in the below disclosure to describe the computing device.

In its preferred embodiment, as shown in FIG. 1, the present invention is implemented on a tablet 110, which comprises a display, a user interface (a touchscreen), a communication module for communicating with a server (via the Internet), and a camera for identifying a physical manipulative. A physical manipulative 100 is moved in front of the tablet 110. The tablet identifies the physical manipulative (preferably visually by using the camera) and displays at least one word relating to the physical manipulative on the screen. For example, it can display the word HORSE if a horse physical manipulative is displayed.

In an embodiment, the tablet 110 is programmed to identify the motion pattern of the physical manipulative 100 as well. This embodiment is shown in FIG. 1. If the horse physical manipulative 100 is moved as if it were galloping, the tablet displays the word GALLOP. This enables a child to learn a new word, to learn how it is spelled, and to learn what it means.

While the physical manipulative 100 is identified visually in the preferred embodiment, it may also be identified by NFC, RFID, sound, a QR pattern, or a bar code. Each physical manipulative may comprise an RFID chip or a QR pattern or a bar code, and a bar code reader, QR reader, NFC module, or RF receiver may be used to identify the physical manipulative.

In an embodiment, the method of identifying the motion of the physical manipulative is different from the method of identifying the physical manipulative itself. So, for example, the tablet's camera can be used to determine how the physical manipulative is moving, while a NFC chip could be used to identify the physical manipulative.

The physical manipulative may be any toy that is easily manipulated by a child. For example, animal figures, stuffed animals, cartoon character figures, dolls, action figures, or vehicles may be used. While it is preferable for the physical manipulative to represent an anthropomorphic character or vehicle such as are commonly used in imaginative play by children, it is not necessarily required. For example, an embodiment of the invention may use blocks.

In the preferred embodiment, the physical manipulative represents a character or an object that has at least one descriptive attribute. For example, a horse is an animal, it goes "Neigh!", it eats grass, it is large, and so on. Such descriptive attributes may be stored in a database and retrieved when a horse manipulative is displayed in front of the computing device. So, rather than displaying the word GALLOP as shown in the Figure, the display may show the word NEIGH or the phrase I EAT GRASS.

In an embodiment shown in FIG. 2, a letter identification board 200 and letter manipulatives 210 are connected to the tablet 110. A user may spell out a word (like GALLOP). The letter identification board 200 identifies each letter and communicates the data to the tablet 110; the tablet determines whether or not the letters spell out a word, and if they do, determines whether or not the word can be used to describe an action, a position, an orientation, or a relationship. In the preferred embodiment, this is accomplished by a database comprising lists of "action words", "position words", and so on. For example, "action words" may be words like RUN, WALK, JUMP, TWIRL, GALLOP, TROT, HOP; "position words" may be words like ON TOP, BELOW, ABOVE, LEFT, RIGHT; "relationship words" may be words like HUG, KISS, HIT, CARRY, SIT ON; "orientation words" can be UPSIDE-DOWN, SIDEWAYS, RIGHT SIDE UP, and so on. FIG. 3 shows an interaction between two physical manipulatives; the two dolls are hugging, so the word HUG is displayed on the screen. In FIG. 4, a letter identification board is used to spell out the word HUG, and two manipulatives are shown in front of the camera; an animation showing the two figures hugging is displayed on the screen.

After the word is identified and determined to be an "action word" (or "position word", "relationship word", or "orientation word), the tablet identifies any physical manipulatives present in front of the camera. If a physical manipulative is present in front of the camera, the tablet shows the physical manipulative performing the action. For example, spelling out the word GALLOP on the letter identification board, and displaying a horse manipulative in front of the tablet, will result in an animation of a galloping horse. If the word is not an "action word", the animation will not be displayed.

In an embodiment, if the word is an "action word" but wrong for the particular physical manipulative (i.e. the word GALLOP combined with a frog), the system may display a message that frogs do not gallop, or display a smiley face laughing at the silliness of a galloping frog.

The letter identification board may use any method of identifying the letters present on the board. Capacitive sensors are used in the preferred embodiment, as disclosed in prior application Ser. No. 14/816,536; however, any other sensors may be used.

Exemplary embodiments have been described above. It will, however, be clear to a person of reasonable skill that the invention encompasses other embodiments, which also fall into the scope of the present invention.

What is claimed is:

1. A method comprising:
   detecting, by one or more processors in communication with a sensor, at least two figurines;
   determining, by the one or more processors, a word that corresponds to an action performable by the at least two figurines;
   determining, by the one or more processors, that the word is correlated by a database to an animation, the correlated animation depicting the action performable by the at least two detected figurines; and
   initiating, by the one or more processors, display of the animation that depicts the action that corresponds to the word and is performable by the at least two figurines.

2. The method of claim 1, further comprising:
   identifying the at least two detected figurines; and wherein:
   the determining of the word that corresponds to the action performable by the at least two figurines is responsive to the identifying of the at least two detected figurines.

3. The method of claim 2, wherein:
   the identifying of the at least two detected figurines includes:
   identifying a first figurine selected from a first group consisting of a first animal figure, a first anamorphic figure, a first cartoon figure, and a first action figure; and
   identifying a second figurine selected from a second group consisting of a second animal figure, a second anamorphic figure, a second cartoon figure, and a second action figure.

4. The method of claim 1, further comprising:
   determining a relationship between a first figurine among the at least two figurines and a second figurine among the at least two figurines; and wherein:
   the initiating of the display of the animation that depicts the action that corresponds to the word and is performable by the at least two figurines is based on the determined relationship between the first figurine and the second figurine.

5. The method of claim 4, further comprising:
   determining a position of the first figurine relative to the second figurine; and wherein:
   the initiating of the display of the animation that depicts the action that corresponds to the word and is performable by the at least two figurines is based on the determined position of the first figurine relative to the second figurine.

6. The method of claim 4, further comprising:
   determining an orientation of the first figurine relative to the second figurine; and wherein:
   the initiating of the display of the animation that depicts the action that corresponds to the word and is performable by the at least two figurines is based on the determined orientation of the first figurine relative to the second figurine.

7. The method of claim 4, further comprising:
   determining an interaction of the first figurine with the second figurine; and wherein:
   the initiating of the display of the animation that depicts the action that corresponds to the word and is performable by the at least two figurines is based on the determined interaction of the first figurine with to the second figurine.

8. Apparatus comprising:
   one or more processors; and
   a memory storing instructions that, when executed by at least one processor among the one or more processors, cause the apparatus to perform operations comprising:
   detecting, via a sensor, at least two figurines;
   determining a word that corresponds to an action performable by the at least two figurines;
   determining that the word is correlated by a database to an animation, the correlated animation depicting the action performable by the at least two detected figurines; and
   initiating display of the animation that depicts the action that corresponds to the word and is performable by the at least two figurines.

9. The apparatus of claim 8, wherein the operations further comprise:
   identifying the at least two detected figurines; and wherein:
   the determining of the word that corresponds to the action performable by the at least two figurines is responsive to the identifying of the at least two detected figurines.

10. The apparatus of claim 9, wherein:
    the identifying of the at least two detected figurines includes:
    identifying a first figurine selected from a first group consisting of a first animal figure, a first anamorphic figure, a first cartoon figure, and a first action figure; and
    identifying a second figurine selected from a second group consisting of a second animal figure, a second anamorphic figure, a second cartoon figure, and a second action figure.

11. The apparatus of claim 8, wherein the operations further comprise:
    determining a relationship between a first figurine among the at least two figurines and a second figurine among the at least two figurines; and wherein:
    the initiating of the display of the animation that depicts the action that corresponds to the word and is performable by the at least two figurines is based on the determined relationship between the first figurine and the second figurine.

12. The apparatus of claim 11, wherein the operations further comprise:

determining a position of the first figurine relative to the second figurine; and wherein:

the initiating of the display of the animation that depicts the action that corresponds to the word and is performable by the at least two figurines is based on the determined position of the first figurine relative to the second figurine.

13. The apparatus of claim 11, wherein the operations further comprise:

determining an orientation of the first figurine relative to the second figurine; and wherein:

the initiating of the display of the animation that depicts the action that corresponds to the word and is performable by the at least two figurines is based on the determined orientation of the first figurine relative to the second figurine.

14. The apparatus of claim 11, wherein the operations further comprise:

determining an interaction of the first figurine with the second figurine; and wherein:

the initiating of the display of the animation that depicts the action that corresponds to the word and is performable by the at least two figurines is based on the determined interaction of the first figurine with to the second figurine.

15. A non-transitory machine-readable medium storing instructions that, when executed by one or more processors of a machine, cause the machine to perform operations comprising:

detecting, via a sensor, at least two figurines;

determining a word that corresponds to an action performable by the at least two figurines;

determining that the word is correlated by a database to an animation, the correlated animation depicting the action performable by the at least two detected figurines; and initiating display of the animation that depicts the action that corresponds to the word and is performable by the at least two figurines.

16. The non-transitory machine-readable medium of claim 15, wherein the operations further comprise:

identifying the at least two detected figurines; and wherein:

the determining of the word that corresponds to the action performable by the at least two figurines is responsive to the identifying of the at least two detected figurines.

17. The non-transitory machine-readable medium of claim 15, wherein the operations further comprise:

determining a relationship between a first figurine among the at least two figurines and a second figurine among the at least two figurines; and wherein:

the initiating of the display of the animation that depicts the action that corresponds to the word and is performable by the at least two figurines is based on the determined relationship between the first figurine and the second figurine.

18. The non-transitory machine-readable medium of claim 17, wherein the operations further comprise:

determining a position of the first figurine relative to the second figurine; and wherein:

the initiating of the display of the animation that depicts the action that corresponds to the word and is performable by the at least two figurines is based on the determined position of the first figurine relative to the second figurine.

19. The non-transitory machine-readable medium of claim 17, wherein the operations further comprise:

determining an orientation of the first figurine relative to the second figurine; and wherein:

the initiating of the display of the animation that depicts the action that corresponds to the word and is performable by the at least two figurines is based on the determined orientation of the first figurine relative to the second figurine.

20. The non-transitory machine-readable medium of claim 17, wherein the operations further comprise:

determining an interaction of the first figurine with the second figurine; and wherein:

the initiating of the display of the animation that depicts the action that corresponds to the word and is performable by the at least two figurines is based on the determined interaction of the first figurine with to the second figurine.

* * * * *

UNITED STATES PATENT AND TRADEMARK OFFICE
CERTIFICATE OF CORRECTION

PATENT NO. : 11,776,418 B2
APPLICATION NO. : 17/152032
DATED : October 3, 2023
INVENTOR(S) : Butler et al.

Page 1 of 1

It is certified that error appears in the above-identified patent and that said Letters Patent is hereby corrected as shown below:

In the Specification

In Column 6, Line 21, in Claim 7, after "with", delete "to"

In Column 7, Line 24, in Claim 14, after "with", delete "to"

In Column 8, Line 41, in Claim 20, after "with", delete "to"

Signed and Sealed this
Twelfth Day of December, 2023

Katherine Kelly Vidal
*Director of the United States Patent and Trademark Office*